United States Patent [19]

Sims

[11] Patent Number: 4,655,569
[45] Date of Patent: Apr. 7, 1987

[54] OPTICAL EYEPIECE ADAPTOR FOR CAMERAS

[76] Inventor: Scott M. Sims, 10424 Dimple Dell Rd., Sandy, Utah 84092

[21] Appl. No.: 804,504

[22] Filed: Dec. 4, 1985

[51] Int. Cl.$^4$ .............................................. G03B 29/00
[52] U.S. Cl. ..................................................... 354/62
[58] Field of Search .................... 354/62, 79, 287, 295

[56] References Cited

U.S. PATENT DOCUMENTS 2,765,718 10/1956 Beecher ................................. 354/79
4,327,984 5/1982 Evans ............................. 354/295 X

FOREIGN PATENT DOCUMENTS 105223 6/1983 Japan ..................................... 354/62

Primary Examiner—Donald A. Griffin
Attorney, Agent, or Firm—K. S. Cornaby

[57] ABSTRACT

A coupling 4 for mating a camera to optical instruments such as endoscopes and medical arthroscopes, the coupling having a base member 4 provided with external threads 3 adapted to threadably engage a camera lens ring 1 and a pair of separable semi-circular members 12, 15 adapter to be mated together so as to form a solid ring which encircles an eye piece 10 of the optical instrument and provided with threaded means 11 for attaching same to the base member.

6 Claims, 1 Drawing Figure

OPTICAL EYEPIECE ADAPTOR FOR CAMERAS

BACKGROUND OF THE INVENTION

1. Field of the Invention

This invention relates to optical instruments such as medical arthroscopes having eyepieces which are larger in diameter at the end next to the viewers eye than the diameter of the instrument in general. More particularly it relates to a device for attatching such an optical instrument to the front of a standard camera, without the use of special tools or accessories.

2. Prior Art

There are several optical instruments, notably medical arthroscopes and endoscopes, for which it is desirable to attach photographic and/or video equipment. This has usually been done by redesigning the camera and fitting it's objective lens with springs and/or screws which press on the sides of the optical intrument's eyepiece and hold it against or in front of said camera's lens.

There are several disadvantages to the previously used systems. Such systems can be difficult to use and depending on their design may not center the optical instrument precisely or automatically. Some of the systems require the use of special tools for assembly, a major disadvantage when used in a surgical environment where everything must be sterile and the wearing of gloves makes using small tools more difficult than usual. However, the most significant disadvantages are that such specially designed and fitted cameras are very expensive and are not very versatile, being useful only for holding the particular optical instrument(s) they were designed for.

OBJECTS AND SUMMARY OF THE INVENTION

It is therefore the object of the present invention to provide an adaptor which will allow the use of standard photographic and video equipment with such specialized optical equipment as medical arthroscopes and endoscopes.

It is also the object of the present invention to provide a device which will hold in rigid and precise axial alignment such specialized optical equipment as described above, in front of the objective lens of a standard photographic or video camera.

It is yet another object of the present invention to provide an adaptor as described above which can be easily and completely removed from the photographic and/or video equipment allowing said equipment to be used for its normal function without interference or damage of any kind.

It is a further object of the present invention to provide a device which allows the operator to attach specialized optical instruments to standard cameras and/or video equipment without the use of any tools or specialized accessories.

Since many of the optical instruments which an individual may wish to use in conjuction with photographic and/or video equipment have parts which are not removable and which project from the sides of said instruments it is the further object of the present invention to provide a device which does not need to fit over said instruments from either end.

These objects are realized in an adaptor consisting of a base member, which is threaded externally with a standard thread used on camera filters, allowing said base member to be attached securely, rigidly and in proper alignment in front of the objective lens of any standard photographic or video camera, and two semi-circular members which when mated form a complete ring which fastens securely, rigidly and in proper alignment into the base member. The tapered internal surface of the mated members serves to automatically align the eyepiece of the optical instrument being adapted with the lens of the photographic or video equipment being used. Because no screws, snaps, rivets or other fasteners are used in the present invention it can easily be assembled and disassembled without the use of any tools whatever. The fact that the adaptor can be made entirely of relatively rugged materials allows the adaptor to be steam or gas sterilized thus eliminating at least one possible source of surgical site contamination.

Other objects and features will be obvious to a person skilled in the art from the following detailed description, taken with the accompanying drawing, which is as follows.

FIG. 1 shows a partial cutaway view of the entire subject adaptor and includes a typical optical instrument (in this case a medical arthroscope) to illustrate the normal relationship of said instrument with the adaptor.

DETAILED DESCRIPTION OF THE INVENTION

Figure 1:
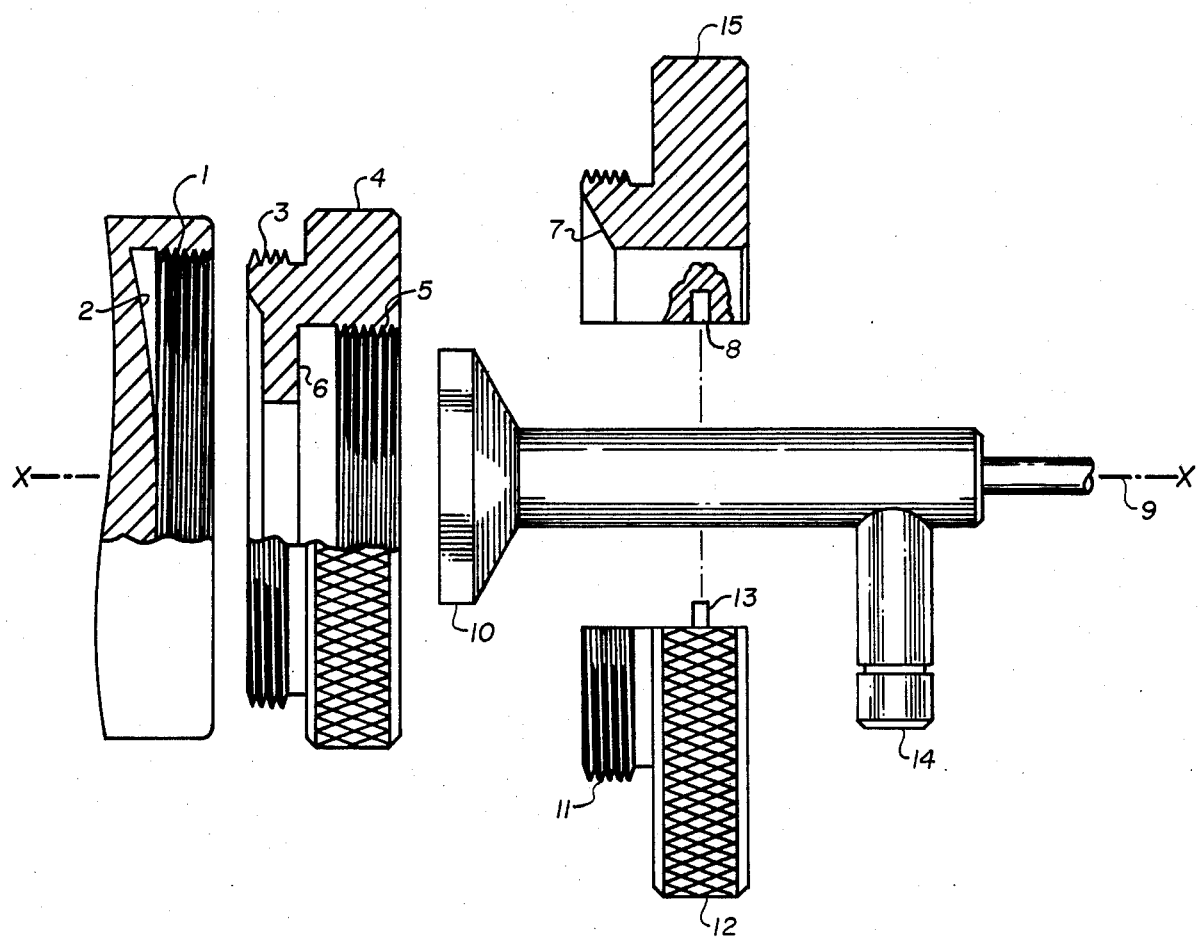

Referring now to the drawing:

The base member 4 is threaded externally at its base with standard camera filter mounting threads 3. Said threads are used to attach the base member securely and in exact axial alignment to the filter attachment threads 1 on the front of virtually any standard camera. The internal surface 6 of the base member 4 is perpendicular to the central axis 9 of the invention.

When installed on the front of a camera, by use of the external threads 3 of the base member 4, the central axis of the invention 9 becomes identical with the central axis of the camera's objective lens 2 and with the central axis of the optical instrument being adapted for use with the camera. The internal threads 5 of the base member are matched to the external threads 11 of the mated semi-circular members 12 and 15.

The mated semi-circular members 12 and 15 are capable of being fitted together in rigid and precise fashion to form a complete ring which is capable of screwing (or fastening rigidly in another fashion) into the base member 4. In the drawing this alignment is accomplished by tapered pins 13 and matching milled holes 8. Other methods of maintaining the mated alingment of the mated semi-circular members 12 and 15 will be apparent to those skilled in the art. This "split ring" design allows the invention to be used with optical instruments possessing non-removable projections 14 which would prevent the use of adaptors which must be slipped over the end of said optical instruments.

The internal surface 7 of the mated semi-circular members 12 and 15 is tapered. Said taper forces the eypiece 10 of the optical instrument to the axial center 9 of the invention when the mated semi-circular members 12 and 15 are screwed into the base member 4 using threads 5 and 11. A further function of the invention is to hold the eyepiece 10 of the optical instrument perpendicular to the central axis 9. This is accomplished by screwing the mated semi-circular members 12 and 15 into the base member 4 and in doing so members 12 and press said eyepiece firmly against the internal surface 6 of the base member 4.

I claim:

1. An improved mechanism for rigidly holding the eyepiece of an optical instrument in alignment with the objective lens of a camera, comprising in combination:
   a base member threaded externally so as to attach to the filter threads of a camera;
   two separable semi-circular members which have means enabling said members to mate together rigidly to form a solid eyepiece-encircling ring which has means so that said ring may be attached securely within the base member.

2. An improved adaptor assembly as defined in claim 1 wherein the forward facing internal surface of the base member is perpendicular to the axis of the external threads and to central axis of said base member.

3. An improved adaptor assembly as defined in claim 1, wherein the internal surface of the mated semi-circular members is angled such that when said mated members are attatched to the base member the distance between the internal surface of the base member and the internal surface of the mated semi-circular members is greatest towards the central axis of the adaptor.

4. An improved adaptor assembly as defined in claim 1, which is made of any of several rigid and sterilizable materials, including but not limited to aluminum, stainless steel, and Teflon.

5. An improved adaptor assembly as defined in claim 1, which can be completely assembled and disassembled without the use of any tools or extraneous equipment.

6. An improved adaptor assembly as defined in claim 1, which allows the use of optical instruments, such as medical arthroscopes and endoscopes, on standard photographic and/or video equipment, and which can be removed quickly and completely from said photographic and/or video equipment allowing said equipment to be used for its usual purpose(s).

* * * * *